(12) United States Patent
Breau et al.

(10) Patent No.: US 8,547,912 B1
(45) Date of Patent: Oct. 1, 2013

(54) MOBILITY BETWEEN TWO DIFFERENT WIRELESS ACCESS NETWORKS

(75) Inventors: Jeremy R. Breau, Leawood, KS (US); Robert C. Pippert, Lenexa, KS (US); Charles Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1041 days.

(21) Appl. No.: 12/537,999

(22) Filed: Aug. 7, 2009

(51) Int. Cl.
*H04W 4/00* (2009.01)
*H04M 1/00* (2006.01)

(52) U.S. Cl.
USPC .......................................... 370/329; 370/331

(58) Field of Classification Search
USPC ........... 370/329, 331, 338; 455/435.2, 432.1, 455/436, 439
See application file for complete search history.

(56) References Cited

U.S. PATENT DOCUMENTS

| | | | |
|---|---|---|---|
| 7,372,835 B2 * | 5/2008 | Lee et al. ...................... 370/331 | |
| 2007/0041346 A1 | 2/2007 | Bae et al. | |
| 2007/0064686 A1 | 3/2007 | Bae et al. | |
| 2007/0207806 A1 | 9/2007 | Shaheen | |
| 2007/0213059 A1 | 9/2007 | Shaheen | |
| 2008/0160994 A1 * | 7/2008 | Ala-Vannesluoma et al. ........................... 455/432.1 | |
| 2009/0042569 A1 * | 2/2009 | Shaheen .................... 455/435.2 | |
| 2009/0073933 A1 * | 3/2009 | Madour et al. ................. 370/331 | |
| 2009/0172785 A1 * | 7/2009 | Chowdhury et al. ............. 726/4 | |
| 2009/0207808 A1 * | 8/2009 | McCann et al. ............... 370/331 | |

* cited by examiner

*Primary Examiner* — Ian N. Moore
*Assistant Examiner* — Thai Nguyen (57) ABSTRACT

A method of assigning a single packet address to a wireless communication device in a communication system comprising a first wireless network and a second wireless network comprises, in the wireless communication device, transferring a first network service request to a router in the first wireless network, wherein the first network service request includes a first network user identifier; in the router, transferring an authorization request to an authorization system, wherein the authorization request includes the first network user identifier; in the authorization system, determining whether the wireless communication device associated with the first network user identifier comprises dual-mode functionality, and determining whether a session for the second wireless network exists based on the first network user identifier; and in the router, transferring a first network service response to the wireless communication device, wherein the first network service response includes a packet address for the second wireless network.

17 Claims, 7 Drawing Sheets

MOBILITY BETWEEN TWO DIFFERENT WIRELESS ACCESS NETWORKS

TECHNICAL BACKGROUND

Wireless communication networks typically include wireless communication devices which, via a wireless access node, communicate with further communication networks and equipment. Recently, a growing demand for mobile high speed data transfers has resulted in the publication of several IP mobility protocols as standardized by the Internet Engineering Task Force (IETF). These Mobile IP standards attempt to solve the problem of a wireless communication device roaming within a network by providing location-independent routing of data packets.

Using Mobile IP, a wireless communication device is associated with a home network and an anchored home IP address. The home network includes a home agent that stores information about the wireless communication device. When the wireless communication device roams into a foreign network, the device is associated with a care-of address which identifies its current location, and the home address is associated with the local endpoint of a tunnel to the home agent. Mobile IP specifies how a wireless communication device registers with its home agent and how the home agent routes packets to the wireless device through the tunnel.

While the standard Mobile IP protocols work well when roaming within different subnets of a network or within different networks utilizing the same IP mobility scheme, a problem arises when a dual-mode wireless communication device capable of communicating with two different wireless access networks that utilize different Mobile IP protocols roams between these networks. Unfortunately, when such a dual-mode wireless communication device is roaming, multiple IP addresses may be assigned to the device, each for use only in a single network, which may cause transmission delay and requires additional IP resources, address translations, and bindings.

Overview

A method of assigning a single packet address to a wireless communication device in a communication system comprising a first wireless network and a second wireless network comprises, in the wireless communication device, transferring a first network service request to a router in the first wireless network, wherein the first network service request includes a first network user identifier. The method further comprises, in the router, transferring an authorization request to an authorization system, wherein the authorization request includes the first network user identifier. The method further comprises, in the authorization system, determining whether the wireless communication device associated with the first network user identifier comprises dual-mode functionality, and determining whether a session for the second wireless network exists based on the first network user identifier. The method further comprises, in the router, transferring a first network service response to the wireless communication device, wherein the first network service response includes a packet address for the second wireless network.

A method of assigning a single packet address to a wireless communication device in a communication system comprising a first wireless network and a second wireless network comprises, in the wireless communication device, transferring a first network service request to a router in the first wireless network, wherein the first network service request includes a first network user identifier. The method further comprises, in the router, transferring an authorization request to an authorization system, wherein the authorization request includes the first network user identifier. The method further comprises, in the authorization system, determining whether the wireless communication device associated with the first network user identifier comprises dual-mode functionality, and translating the first network user identifier into a second network user identifier. The method further comprises, in the authorization system, transferring a pre-authorization request to a subscriber system, wherein the pre-authorization request includes the second network user identifier. The method further comprises, in the subscriber system, generating an information block in response to the pre-authorization request and transferring the information block to the authorization system, wherein the information block comprises the second network user identifier, a gateway identifier, and an authorization key. The method further comprises, in the authorization system, transferring the information block and a request for a packet address for the second wireless network to the router. The method further comprises, in the router, transferring a second network service request to a gateway in the second wireless network based on the gateway identifier, wherein the second network service request includes the second network user identifier and the authorization key. The method further comprises, in the gateway, transferring the second network service request to the subscriber system. The method further comprises, in the subscriber system, comparing the authorization key included in the second network service request to the authorization key included in the information block, and if the authorization key included in the second network service request matches the authorization key included in the information block, then transferring an authorization approval to the gateway. The method further comprises, in the gateway, assigning the packet address for the second wireless network to the wireless communication device associated with the second network user identifier, and transferring the packet address for the second wireless network to the router. The method further comprises, in the router, transferring a first network service response to the wireless communication device, wherein the first network service response includes the packet address for the second wireless network.

A method of assigning a single packet address to a wireless communication device in a communication system comprising a code division multiple access (CDMA) core network and a long term evolution (LTE) core network comprises, in the wireless communication device, transferring a CDMA service request to a home agent, wherein the CDMA service request includes a CDMA user identifier. The method further comprises, in the home agent, transferring an authorization request to an Authentication, Authorization, and Accounting (AAA) server, wherein the authorization request includes the CDMA user identifier. The method further comprises, in the AAA server, determining whether the wireless communication device associated with the CDMA user identifier comprises dual-mode functionality, and determining whether a LTE session exists based on the CDMA user identifier. The method further comprises, in the home agent, transferring a CDMA service response to the wireless communication device, wherein the CDMA service response includes a LTE packet address.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
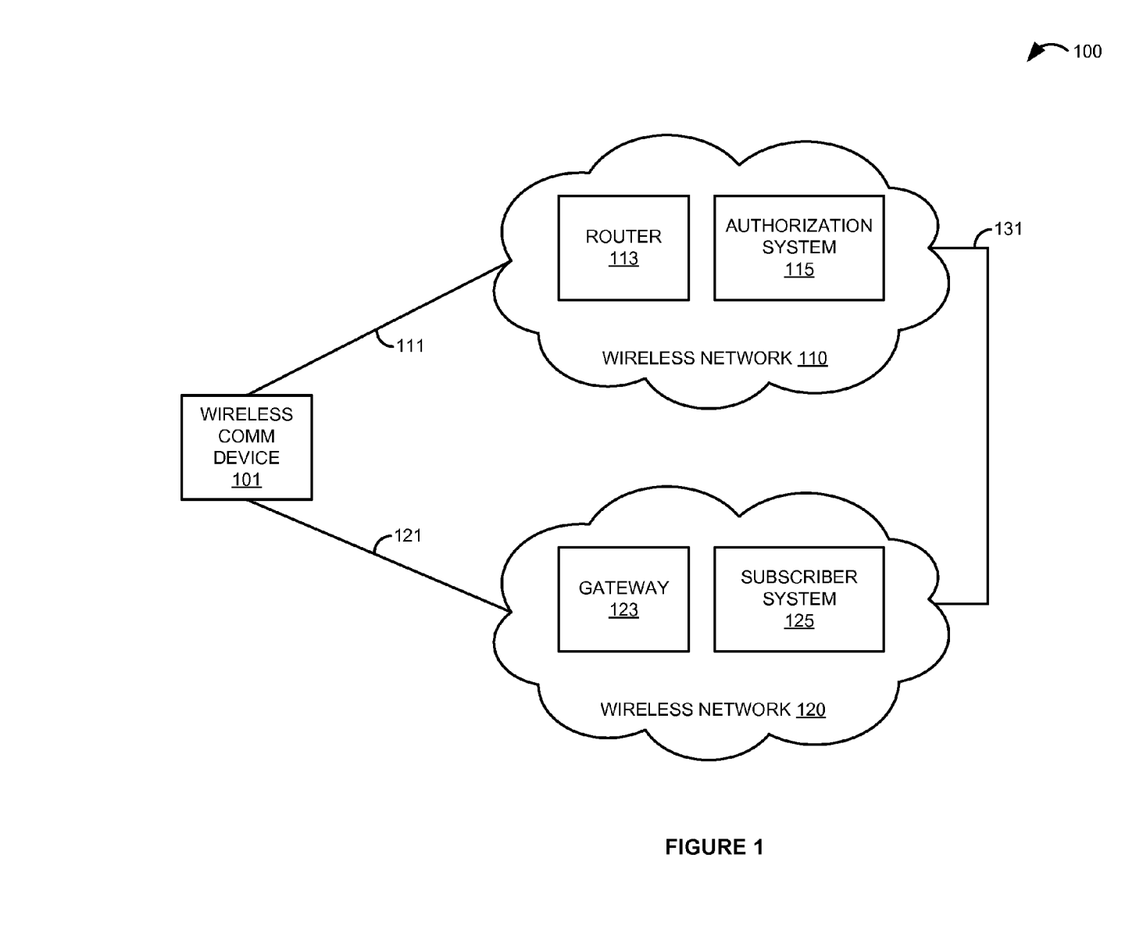
FIG. 1 is a block diagram that illustrates a communication system.

FIG. 1 is a block diagram that illustrates communication system 100. Communication system 100 includes wireless communication device 101, wireless network 110, and wireless network 120. Wireless network 110 includes router 113 and authorization system 115. Wireless network 120 includes gateway 123 and subscriber system 125. Wireless communication device 101 communicates with wireless networks 110 and 120 over respective wireless communication links 111 and 121. Wireless network 110 is in communication with wireless network 120 over communication link 131.

Figure 2:
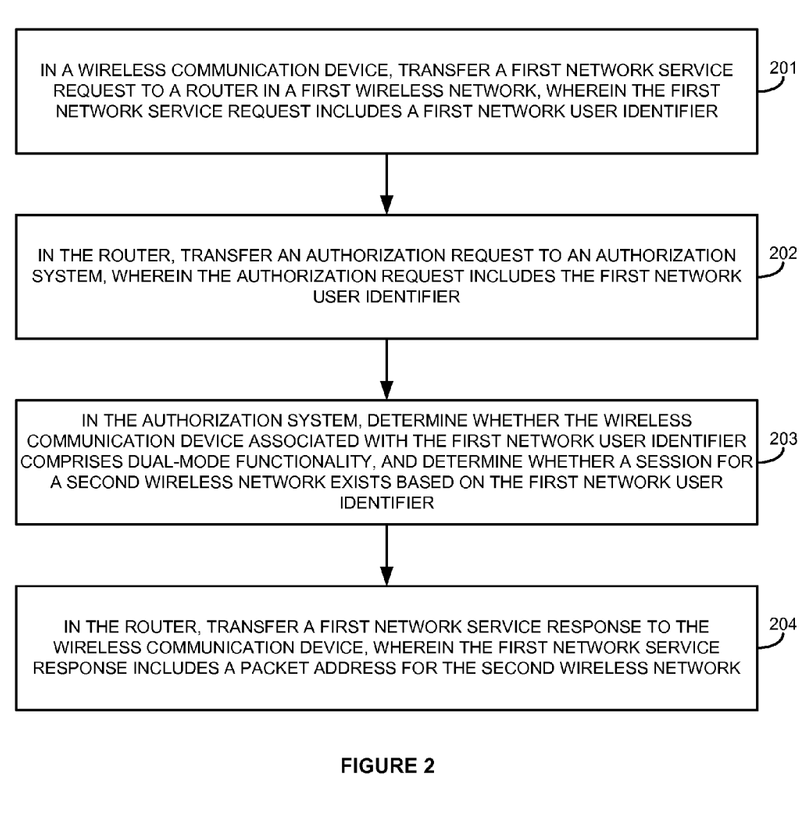
FIG. 2 is a flow diagram that illustrates an operation of the communication system.

FIG. 2 is a flow diagram that illustrates an operation of communication system 100. In FIG. 2, wireless communication device 101 transfers a first network service request to router 113 in wireless network 110 (201). The first network service request includes a first network user identifier (201).

The first network user identifier comprises a unique identifier that identifies a user of wireless communication device 101 to a first wireless network, such as wireless network 110. Some examples of a first network user identifier include a telephone number, Electronic Serial Number (ESN), Mobile Station Identifier (MSID), Mobile Equipment Identifier (MEID), International Mobile Equipment Identity (IMEI), User Identity Module Identifier (UIMI), or some other identifier that identifies wireless communication device 101 to wireless network 110.

Router 113 transfers an authorization request to authorization system 115 (202). The authorization request includes the first network user identifier (202). The authorization request typically instructs authorization system 115 to authenticate and authorize wireless communication device 101 to communicate over wireless network 110.

In response to the authorization request, authorization system 115 determines whether the wireless communication device 101 associated with the first network user identifier comprises dual-mode functionality (203). The presence of dual-mode functionality enables wireless communication device 101 to communicate with multiple wireless networks, such as wireless networks 110 and 120. In one example, the dual-mode functionality comprises code division multiple access (CDMA) and long term evolution (LTE) modes. Note that the term "dual-mode" is not intended to limit the ability of wireless communication device 101 to communicate with only two wireless networks. On the contrary, any wireless communication device capable of communication with at least two wireless networks could be used.

Authorization system 115 may determine whether wireless communication device 101 associated with the first network user identifier comprises dual-mode functionality in a variety of ways. In one example, authorization system 115 may determine whether wireless communication device 101 comprises dual-mode functionality based on the first network user identifier. For example, authorization system 115 may reference a database which relates the first network user identifier with a presence or absence of dual-mode functionality. In another example, wireless communication device 101 may inform authorization system 115 of a presence of dual-mode functionality by including a message, such as by setting a flag or dual-mode bit, in the first network service request transferred to router 113 in operation 201, which could then be included in the authorization request transferred to authorization system 115 in operation 202.

In addition to determining dual-mode functionality, authorization system 115 also determines whether a session for wireless network 120 exists based on the first network user identifier (203). Authorization system 115 may determine whether a session for wireless network 120 exists by referencing a database that relates the first network user identifier with a presence or absence of an existing session for wireless network 120. Authorization system 115 determines whether a session for wireless network 120 exists because an existing session indicates that wireless communication device 101 has already been assigned a packet address for wireless network 120. If authorization system 115 does not find an existing session for wireless network 120, a new packet address must be assigned to wireless communication device 101 for wireless network 120.

Router 113 transfers a first network service response to wireless communication device 101 (204). The first network service response includes a packet address for wireless network 120 (204). Advantageously, the packet address is enabled for wireless network 120, so that wireless communication device 101 may communicate with wireless network 120 in addition to wireless network 110 using the same packet address.

Figure 3:
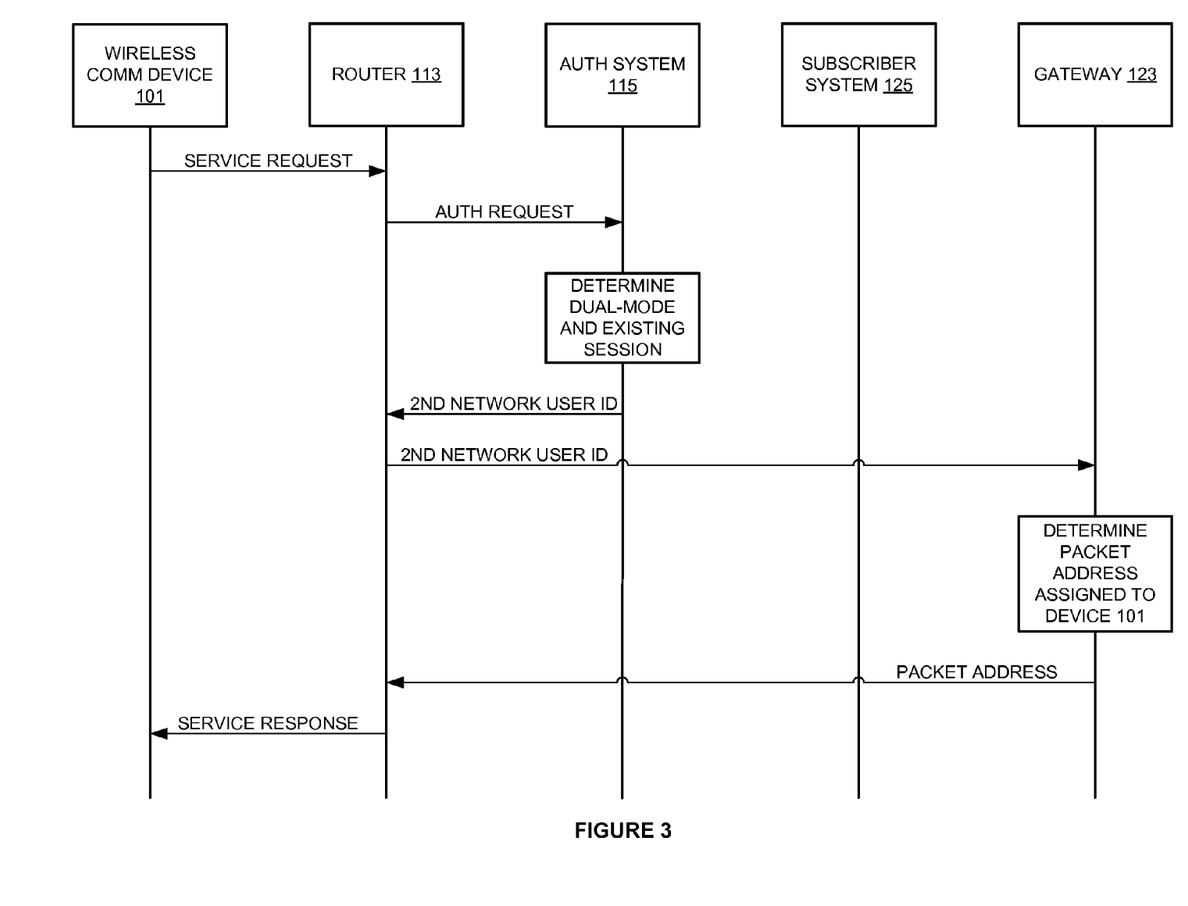
FIG. 3 is a sequence diagram that illustrates an operation of the communication system.

FIG. 3 is a sequence diagram that illustrates an operation of communication system 100. FIG. 3 provides an exemplary scenario in which wireless communication device 101 has an existing session for wireless network 120.

To begin, wireless communication device 101 transfers a first network service request to router 113 in wireless network 110. The first network service request includes a first network user identifier. Router 113 transfers an authorization request to authorization system 115. Router 113 includes the first network user identifier in the authorization request.

Authorization system 115 determines whether the wireless communication device 101 associated with the first network user identifier comprises dual-mode functionality. In addition, authorization system 115 also determines whether an existing session for wireless communication device 101 on wireless network 120 exists based on the first network user identifier. As stated above, authorization system 115 determines in this example scenario that an existing session for wireless network 120 does exist, indicating that wireless communication device 101 has already been assigned a packet address for wireless network 120.

Authorization system 115 transfers a second network user identifier to router 113. The second network user identifier comprises a unique identifier that identifies a user of wireless communication device 101 to a second wireless network, such as wireless network 120. Some examples of a second network user identifier include a telephone number, Electronic Serial Number (ESN), Mobile Station Identifier (MSID), Mobile Equipment Identifier (MEID), International Mobile Equipment Identity (IMEI), User Identity Module Identifier (UIMI), or some other identifier that identifies wireless communication device 101 to wireless network 120.

The second network user identifier comprises a format recognizable by wireless network 120. In one example, authorization system 115 may translate the first network user identifier into the second network user identifier. In another example, the first network user identifier is the same as the second network user identifier.

Router 113 transfers the second network user identifier to gateway 123 in wireless network 120. Gateway 123 recognizes the second network user identifier and determines that wireless communication device 101 is associated with the second network user identifier. Gateway 123 then determines the packet address assigned to wireless communication device 101. In one example, gateway 123 may reference a database which relates the second network user identifier with wireless communication device 101 and the packet address assigned to device 101.

Once gateway 123 determines the packet address currently assigned to wireless communication device 101, gateway 123 transfers the packet address to router 113. Router 113 transfers a first network service response to wireless communication device 101. The first network service response includes the packet address for wireless network 120. Advantageously, wireless communication device 101 may now communicate with wireless network 110 using the same packet address already assigned and enabled for wireless network 120.

Figure 4:
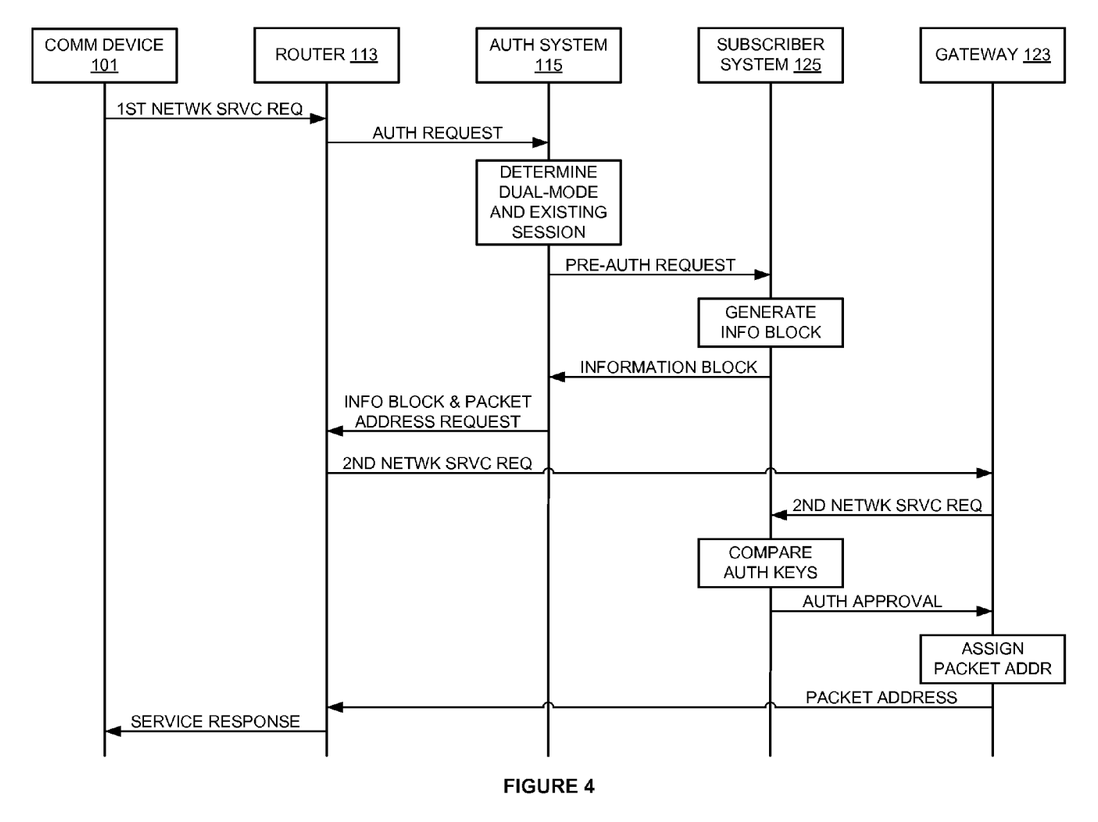
FIG. 4 is a sequence diagram that illustrates an operation of the communication system.

FIG. 4 is a sequence diagram that illustrates an operation of communication system 100. FIG. 4 provides an exemplary scenario in which wireless communication device 101 does not have an existing session for wireless network 120.

To begin, wireless communication device 101 transfers a first network service request to router 113 in wireless network 110. The first network service request includes a first network user identifier. Router 113 transfers an authorization request to authorization system 115. Router 113 includes the first network user identifier in the authorization request.

Authorization system 115 determines whether the wireless communication device 101 associated with the first network user identifier comprises dual-mode functionality. In addition, authorization system 115 also determines whether an existing session for wireless communication device 101 on wireless network 120 exists based on the first network user identifier. As stated above, authorization system 115 determines in this example scenario that an existing session for wireless network 120 does not exist, indicating that wireless communication device 101 has not been assigned a packet address for wireless network 120.

Authorization system 115 translates the first network user identifier into a second network user identifier (not shown in FIG. 4). The second network user identifier comprises a unique identifier that identifies a user of wireless communication device 101 to a second wireless network, such as wireless network 120. The second network user identifier comprises a format recognizable by wireless network 120. In one example, the first network user identifier is the same as the second network user identifier.

Authorization system 115 then transfers a pre-authorization request to subscriber system 125. The pre-authorization request includes the second network user identifier.

In response to the pre-authorization request, subscriber system 125 generates an information block. The information block comprises the second network user identifier, a gateway identifier, and an authorization key. The gateway identifier identifies a gateway in wireless network 120, such as gateway 123. The authorization key comprises a unique code known only to subscriber system 125. In one example, subscriber system 125 generates the authorization key using a random code generator. Subscriber system 125 may record the authorization key included in the information block for later comparison.

Subscriber system 125 transfers the information block to authorization system 115. Authorization system 115 transfers the information block and a request for a packet address for wireless network 120 to router 113.

Router 113 transfers a second network service request to gateway 123 in wireless network 120 based on the gateway identifier. The second network service request includes the second network user identifier and the authorization key. Gateway 123 transfers the second network service request to subscriber system 125.

Subscriber system 125 compares the authorization key included in the second network service request to the authorization key included in the information block. If the authorization key included in the second network service request matches the authorization key included in the information block, subscriber system 125 transfers an authorization approval to gateway 123.

In response to receiving the authorization approval from subscriber system 125, gateway 123 assigns the packet address for wireless network 120 to wireless communication device 101. The packet address assigned to wireless communication device 101 is enabled for wireless network 120 and allows device 101 to communicate with network 120.

Once gateway 123 assigns the packet address to wireless communication device 101, gateway 123 transfers the packet address to router 113. Router 113 transfers a first network service response to wireless communication device 101. The first network service response includes the packet address for wireless network 120. Advantageously, wireless communication device 101 may now communicate with wireless network 110 using the same packet address assigned to wireless communication device 101 for wireless network 120.

Referring back to FIG. 1, wireless communication device 101 may comprise any device capable of wireless communication with at least two different wireless access networks. Wireless communication device 101 comprises hardware and circuitry programmed to function as a telecommunications device, such as radio frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or any other wireless network protocol that facilitates communication between wireless communication device 101 and wireless networks 110 and 120.

Wireless networks 110 and 120 could comprise wireless access points or nodes, telephony switches, Internet routers, network gateways, computer systems, communication links, or some other type of communication equipment—including combinations thereof. Wireless networks 110 and 120 may be in communication with further communication networks and systems. Wireless network 110 may comprise one type or generation of wireless network, while wireless network 120 may comprise a different type or generation of wireless network. For example, wireless network 110 could comprise a third generation (3G) 3GPP2 CDMA network and wireless network 120 could comprise a fourth generation (4G) 3GPP LTE network.

Wireless communication links 111 and 121 use the air or space as the transport medium. Wireless communication links 111 and 121 may use various protocols, such as CDMA, GSM, UMTS, HSPA, EV-DO, EV-DO rev. A, 3GPP LTE, WiMAX, Wi-Fi, Internet, telephony, or some other communication format—including combinations thereof.

Router 113 comprises a computer system and communication interface. Router 113 may also include other components such a server, data storage system, and power supply. Router 113 may reside in a single device or may be distributed across multiple devices. Router 113 may be a discrete system or may be integrated within other systems—including other systems within wireless network 110. Router 113 could comprise a home agent, mobile switching center, network gateway system, Internet access node, application server, service node, or some other communication system—including combinations thereof. Router 113 is in communication with wireless network 120, gateway 123, and subscriber system 125 via communication link 131.

Authorization system 115 comprises a computer system and communication interface. Authorization system 115 may also include other components such as a router, server, data storage system, and power supply. Authorization system 115 may reside in a single device or may be distributed across multiple devices. Authorization system 115 may be a discrete system or may be integrated within other systems—including other systems within wireless network 110. Authorization system 115 could comprise an authentication, authorization, and accounting (AAA) server, mobile switching center, network gateway system, Internet access node, application server, service node, or some other communication system—including combinations thereof. Authorization system 115 is in communication with wireless network 120, gateway 123, and subscriber system 125 via communication link 131.

Gateway 123 comprises a computer system and communication interface. Gateway 123 may also include other components such a router, server, data storage system, and power supply. Gateway 123 may reside in a single device or may be distributed across multiple devices. Gateway 123 may be a discrete system or may be integrated within other systems—including other systems within wireless network 120. Gateway 123 could comprise a packet gateway, packet data network gateway (PDN GW), mobile switching center, network gateway system, Internet access node, application server, service node, or some other communication system—including combinations thereof. Gateway 123 is in communication with wireless network 110, router 113, and authorization system 115 via communication link 131.

Subscriber system 125 comprises a computer system and communication interface. Subscriber system 125 may also include other components such a router, server, data storage system, and power supply. Subscriber system 125 may reside in a single device or may be distributed across multiple devices. Subscriber system 125 may be a discrete system or may be integrated within other systems—including other systems within wireless network 120. Subscriber system 125 could comprise a home subscriber server (HSS), user profile server function (UPSF), mobile switching center, network gateway system, Internet access node, application server, service node, or some other communication system—including combinations thereof. Subscriber system 125 is in communication with wireless network 110, router 113, and authorization system 115 via communication link 131.

Communication link 131 uses metal, air, space, optical fiber such as glass or plastic, or some other material as the transport media—including combinations thereof. Communication link 131 could use various communication protocols, such as TDM, IP, Ethernet, telephony, optical networking, wireless protocols, hybrid fiber coax (HFC), communication signaling, or some other communication format—including combinations thereof. Communication link 131 could be a direct link or may include intermediate networks, systems, or devices.

Figure 5:
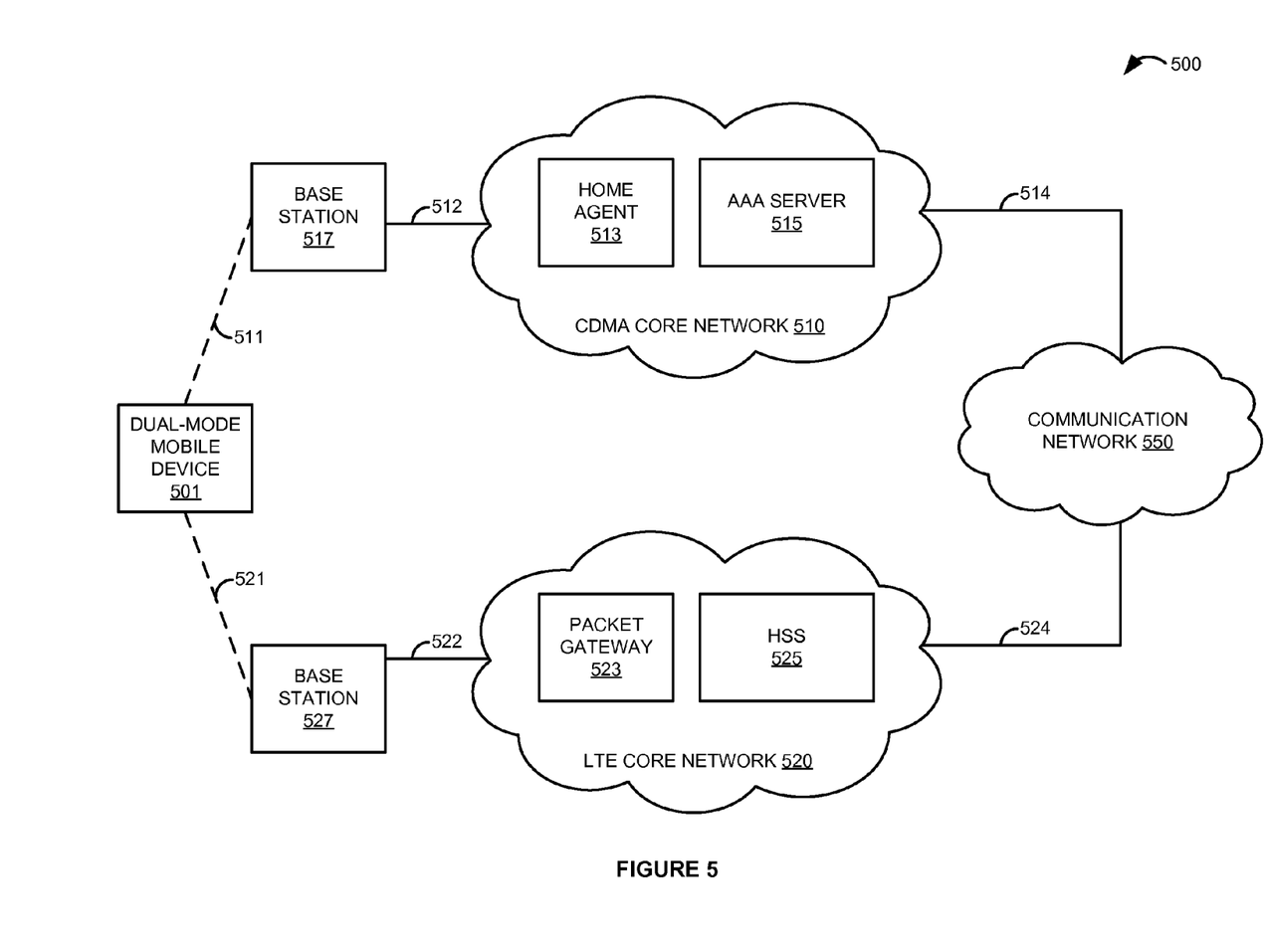
FIG. 5 is a block diagram that illustrates a communication system in an exemplary embodiment.

FIG. 5 is a block diagram that illustrates communication system 500 in an exemplary embodiment. Communication system 500 includes dual-mode mobile device 501, base stations 517 and 527, CDMA core network 510, LTE core network 520, and communication network 550. CDMA core network 510 includes home agent 513 and AAA server 515. LTE core network 520 includes packet gateway 523 and HSS 525. Dual-mode mobile device 501 communicates with base stations 517 and 527 over respective wireless communication links 511 and 521. Base station 517 is in communication with CDMA core network 510 via communication link 512. Likewise, base station 527 is in communication with LTE core network 520 via communication link 522. CDMA core network 510 and LTE core network 520 are in communication with each other over communication network 550 via respective communication links 514 and 524.

Currently, the EV-DO communications protocol, as standardized by the Third Generation Partnership Project 2 (3GPP2), utilizes IETF IP mobility standard RFC3344 (Mobile IPv4). The LTE standard, however, has adopted RFC5213 (Proxy Mobile IPv6) for handling IP mobility. Thus, an IP address obtained on 3GPP2 CDMA core network 510 is incompatible with 3GPP LTE core network 520, and vice versa. If a user of dual-mode mobile device 501 first acquires an IP from CDMA core network 510, and then moves into LTE core network 520, dual-mode device 501 needs to acquire a different IP enabled for LTE core network 520 under the existing implementation.

In the exemplary embodiment of FIG. 5, the operation of home agent 513, AAA server 515, and HSS 525 are modified to support seamless IP mobility between the two different access networks 510 and 520 while maintaining the same IP address. Generally, dual-mode mobile device 501 requests an IP address from CDMA core network 510, CDMA core network 510 obtains an IP address for the user from LTE core network 520, and CDMA core network 510 returns the IP address to the user of dual-mode device 501 for use on either network 510 or 520. The reciprocal of this procedure could also be performed when a device first requests an IP address from gateway 523 in LTE core network 520. In order to avoid unnecessarily assigning multiple IP addresses, when device 501 requests an IP address from either network, a determination is made to discover whether a communication session for dual-mode device 501 already exists, indicating that device 501 has already obtained an IP address from one of the networks 510 or 520.

In operation, the initial steps are the same regardless of whether dual-mode device 501 has already obtained an IP address from one of the networks 510 or 520. If mobile device 501 first enters CDMA core network 510, device 501 transfers a CDMA service request to request an IP from home agent 513, and includes its MEID or some other CDMA user identifier with the request. Home agent transfers the request to AAA server 515 along with the MEID of device 501. AAA server 515 determines whether dual-mode device 501 has dual-mode capabilities supporting both 3GPP2 CDMA/EV-DO and 3GPP LTE network standards, and whether an LTE session exists based on the MEID provided by device 501. If AAA server 515 determines that device 501 does not have dual-mode functionality, AAA server 515 instructs home agent 513 to assign an IP to device 501 in the typical manner following the RFC3344 standard since device 501 cannot communicate with LTE core network 520 in this case.

However, if AAA server 515 determines that device 501 has dual-mode CDMA/LTE capabilities and an LTE session exists based on the MEID provided by device 501, then AAA server 515 must ensure that the LTE enabled IP is returned to device 501. To achieve this, AAA server 515 translates the MEID or other CDMA user ID into an LTE user identifier known to LTE core network 520. AAA server 515 then transfers the LTE user ID to home agent 513. Home agent 513 then forwards the LTE user ID to packet gateway 523 in the LTE core network 520. Effectively, the home agent 513 provides a translation function between the Mobile IPv4 (RFC3344) standard in the CDMA network 510 and the Proxy Mobile IPv6 (RFC5213) standard in the LTE network 520.

Packet gateway 523 determines the LTE IP that is already assigned to dual-mode device 501 based on the LTE user identifier received from the home agent 513, and transfers the LTE IP back to home agent 513. In some examples, an intermediary system provides a bind function between home agent 513 and packet gateway 523. In this case, home agent 513 transfers the LTE user ID to the bind function, the bind function forwards the LTE user ID to packet gateway 523, packet gateway 523 returns the LTE enabled IP to the bind function, and the bind function transfers the LTE IP to home agent 513.

In the alternative, if AAA server 515 determines that device 501 does not have an existing LTE session based on the MEID provided by device 501, then AAA server 515 must ensure that a new LTE enabled IP is assigned to device 501. To achieve this, AAA server 515 translates the MEID or other CDMA user ID into an LTE user identifier known to LTE core network 520. AAA server 515 then transfers a pre-authorization request to HSS 525, which includes the LTE user ID. AAA server 515 may transfer the pre-authorization request to HSS 525 over communication links 514 and 524, or may transfer the pre-authorization request over a direct link between CDMA network 510 and LTE network 520.

In response to the pre-authorization request, HSS 525 generates an information block which includes the LTE user ID, a gateway identifier that identifies packet gateway 523, and an authorization key known only to HSS 525. HSS 525 may generate the authorization key using a random code generator, and record the authorization key included in the information block for later comparison and authentication. HSS 525 transfers the information block to AAA server 515. HSS 525 may transfer the information block to AAA server 515 over communication links 524 and 514, or may transfer the information block over a direct link between CDMA network 510 and LTE network 520.

AAA server 515 transfers the information block and a request for an LTE enabled IP to the home agent 513. Home agent 513 transfers an LTE service request to packet gateway 523 as identified by the gateway identifier included in the information block. The LTE service request includes the LTE user ID and the authorization key included in the information block created by HSS 525.

Packet gateway 523 transfers the LTE service request to HSS 525 for verification and authorization. HSS 525 compares the authorization key included in the LTE service request to the authorization key the HSS included in the information block, and if the keys match, HSS 525 transfers an authorization approval to packet gateway 523.

Packet gateway 523 assigns an LTE enabled packet address to dual-mode device 501. In some examples, CDMA core network 510 and LTE core network 520 share a common IP pool, or plurality of packet addresses. In this case, gateway 523 assigns the LTE IP from a packet address in the common IP pool. Once packet gateway 523 assigns an LTE IP to dual-mode device 501, gateway 523 transfers the LTE IP to the home agent 513 in CDMA core network 510.

After home agent 513 receives the LTE enabled IP from packet gateway 523, regardless of whether the LTE IP was just assigned by gateway 523 or was previously assigned to device 501 during an existing LTE session, the home agent 513 then transfers a CDMA service response to dual-mode device 513. The CDMA service response includes the LTE IP. The LTE IP can now be used by dual-mode device 501 to access communication network 550 over both CDMA core network 510 and LTE core network 520. The LTE IP becomes the home address of device 501 for purposes of IP mobility within CDMA core network 510 under the Mobile IPv4 (RFC3344) standard. If dual-mode device 501 connects to base station 527 (which comprises an LTE radio access network (RAN) standard compliant eNodeB wireless access node), device 501 can communicate with LTE core network 520 using this same IP address. Advantageously, the exemplary embodiment of FIG. 5 creates a simplified ability for CDMA operators to support seamless IP roaming with LTE network operators through a simple interface at the IP signaling layer, thereby avoiding complex changes at the mobile node, radio access, and network access servers and other elements of a typical CDMA/EV-DO network infrastructure.

Figure 6:
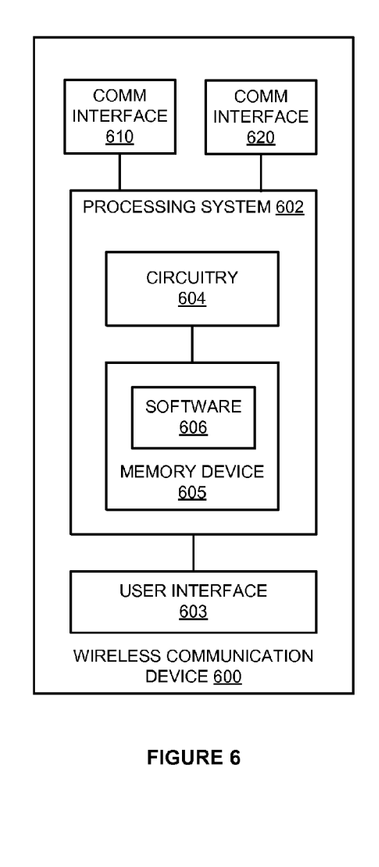
FIG. 6 is a block diagram that illustrates a wireless communication device.

FIG. 6 is a block diagram that illustrates wireless communication device 600. Wireless communication device 600 provides an example of wireless communication device 101, although device 101 could use alternative configurations. Wireless communication device 600 comprises wireless communication interfaces 610 and 620, processing system 602, and user interface 603. Processing system 602 is linked to wireless communication interfaces 610 and 620 and user interface 603. Processing system 602 includes processing circuitry 604 and memory device 605 that stores operating software 606. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication interfaces 610 and 620 comprise RF communication circuitry and an antenna. Note that interfaces 610 and 620 could be integrated within the same components or circuitry and share the same antenna. The RF communication circuitry typically includes an amplifier, filter, RF modulator, and signal processing circuitry. Wireless communication interfaces 610 and 620 may also include a memory device, software, processing circuitry, or some other communication device. Wireless communication interfaces 610 and 620 may use various protocols, such as CDMA, GSM, UMTS, HSPA, EV-DO, EV-DO rev. A, 3GPP LTE, WiMAX, Wi-Fi, or some other wireless communication format. Wireless communication interface 610 is capable of communicating with a first wireless network, and wireless communication interface 620 is capable of communicating with a second wireless network.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 may be omitted in some examples.

Processing circuitry 604 comprises microprocessor and other circuitry that retrieves and executes operating software 606 from memory device 605. Memory device 605 comprises a disk drive, flash drive, data storage circuitry, or some other memory apparatus. Processing circuitry 604 is typically mounted on a circuit board that may also hold memory device 605 and portions of communication interfaces 610 and 620 and user interface 603. Operating software 606 comprises computer programs, firmware, or some other form of machine-readable processing instructions. Operating software 606 may include an operating system, utilities, drivers, network interfaces, applications, or some other type of software. When executed by processing circuitry 604, operating software 606 directs processing system 602 to operate wireless communication device 600 as described herein. In particular, operating software 606 directs processing system 602 to transfer a first network service request to a router in a first wireless network, wherein the first network service request includes a first network user identifier. Operating software 606 also directs processing system 602 to receive a first network service response from a router, wherein the first network service response includes a packet address for a second wireless network.

Figure 7A:
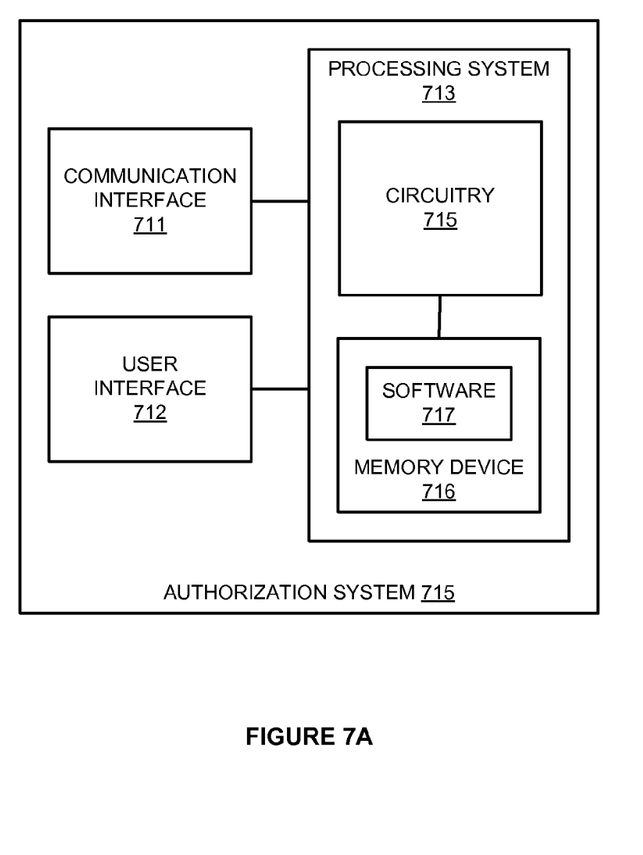
FIG. 7A is a block diagram that illustrates an authorization system.

FIG. 7A is a block diagram that illustrates authorization system 715. Authorization system 715 provides an example of authorization system 115, although system 115 may use alternative configurations. Authorization system 715 comprises communication interface 711, user interface 712, and processing system 713. Processing system 713 is linked to communication interface 711 and user interface 712. Processing system 713 includes processing circuitry 715 and memory device 716 that stores operating software 717.

Communication interface 711 comprises components that communicate over communication links, such as network cards, ports, RF transceivers, processing circuitry and software, or some other communication components. Communication interface 711 may be configured to communicate over metallic, wireless, or optical links. Communication interface 711 may be configured to use TDM, IP, Ethernet, optical networking, wireless protocols, communication signaling, or some other communication format—including combinations thereof. Communication interface 711 is capable of receiving an authorization request from a router and an information block from a subscriber system. Communication interface 711 is also capable of transferring the information block, a request for a packet address, and a second network user identifier to the router, and a pre-authorization request to the subscriber system.

User interface 712 comprises components that interact with a user. User interface 712 may include a keyboard, display screen, mouse, touch pad, touch screen, or some other user input/output apparatus. User interface 712 may be omitted in some examples.

Processing circuitry 715 comprises microprocessor and other circuitry that retrieves and executes operating software 717 from memory device 716. Memory device 716 comprises a disk drive, flash drive, data storage circuitry, or some other memory apparatus. Operating software 717 comprises computer programs, firmware, or some other form of machine-readable processing instructions. Operating software 717 may include an operating system, utilities, drivers, network interfaces, applications, or some other type of software. When executed by circuitry 715, operating software 717 directs processing system 713 to operate as described herein. In particular, operating software 717 directs processing system 713 to translate a first network user identifier into a second network user identifier, transfer an information block, a request for a packet address, and the second network user identifier to a router, and transfer a pre-authorization request to a subscriber system. Operating software 717 also directs processing system 713 to determine whether a wireless communication device associated with the first network user identifier comprises dual-mode functionality, and to determine whether a session for a second wireless network exists based on the first network user identifier.

Figure 7B:
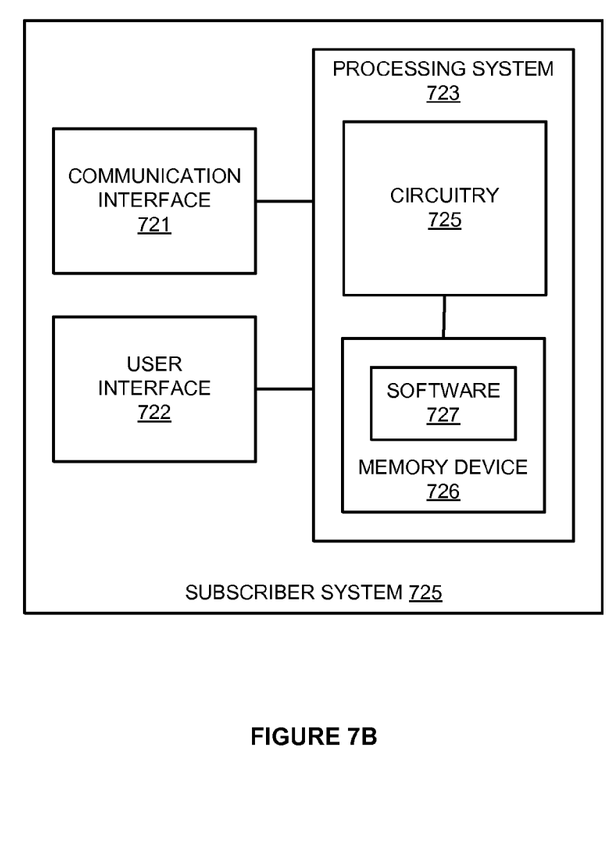
FIG. 7B is a block diagram that illustrates a subscriber system.

FIG. 7B is a block diagram that illustrates subscriber system 725. Subscriber system 725 provides an example of subscriber system 125, although system 125 may use alternative configurations. Subscriber system 725 comprises communication interface 721, user interface 722, and processing system 723. Processing system 723 is linked to communication interface 721 and user interface 722. Processing system 723 includes processing circuitry 725 and memory device 726 that stores operating software 727.

Communication interface 721 comprises components that communicate over communication links, such as network cards, ports, RF transceivers, processing circuitry and software, or some other communication components. Communication interface 721 may be configured to communicate over metallic, wireless, or optical links. Communication interface 721 may be configured to use TDM, IP, Ethernet, optical networking, wireless protocols, communication signaling, or some other communication format—including combinations thereof. Communication interface 721 is capable of receiving a pre-authorization request from an authorization system and a second network service request from a gateway. Communication interface 721 is also capable of transferring an information block to the authorization system and an authorization approval to the gateway.

User interface 722 comprises components that interact with a user. User interface 722 may include a keyboard, display screen, mouse, touch pad, touch screen, or some other user input/output apparatus. User interface 722 may be omitted in some examples.

Processing circuitry 725 comprises microprocessor and other circuitry that retrieves and executes operating software 727 from memory device 726. Memory device 726 comprises a disk drive, flash drive, data storage circuitry, or some other memory apparatus. Operating software 727 comprises computer programs, firmware, or some other form of machine-readable processing instructions. Operating software 727 may include an operating system, utilities, drivers, network interfaces, applications, or some other type of software. When executed by circuitry 725, operating software 727 directs processing system 723 to operate as described herein. In particular, operating software 727 directs processing system 723 to generate an information block in response to a pre-authorization request, and transfer the information block to an authorization system. Operating software 727 also directs processing system 723 to compare an authorization key included in a second network service request to an authorization key included in the information block, and if the authorization key included in the second network service request matches the authorization key included in the information block, transfer an authorization approval to a gateway.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of assigning a single packet address to a wireless communication device in a communication system comprising a first wireless network and a second wireless network, the method comprising:
   in the wireless communication device, transferring a first network service request to a router in the first wireless network, wherein the first network service request includes a first network user identifier;
   in the router, transferring an authorization request to an authorization system, wherein the authorization request includes the first network user identifier;
   in the authorization system, determining whether the wireless communication device associated with the first network user identifier comprises dual-mode functionality, and determining whether a session for the second wireless network exists based on the first network user identifier;
   if the session for the second wireless network does not exist, then in the authorization system, translating the first network user identifier into a second network user identifier, transferring a pre-authorization request that includes the second network user identifier to a subscriber system, wherein the subscriber system generates an information block in response to the pre-authorization request, receiving the information block in response to the pre-authorization request, wherein the information block comprises the second network user identifier and an authorization key, and transferring a request for a packet address enabled for the second wireless network to the router; and
   in the router, transferring a first network service response to the wireless communication device, wherein the first network service response includes the packet address enabled for the second wireless network.

2. The method of claim 1 further comprising:
   if the session for the second wireless network exists, then in the authorization system, transferring a second network user identifier to the router.

3. The method of claim 2 further comprising:
   in the router, transferring the second network user identifier to a gateway in the second wireless network.

4. The method of claim 3 further comprising:
   in the gateway, determining the packet address enabled for the second wireless network associated with the second network user identifier.

5. The method of claim 4 further comprising:
   in the gateway, transferring the packet address enabled for the second wireless network to the router.

6. The method of claim 1 wherein, in the authorization system, transferring the request for the packet address enabled for the second wireless network to the router comprises transferring the information block and the request for the packet address enabled for the second wireless network to the router.

7. The method of claim 6 further comprising:
   in the router, transferring a second network service request to a gateway in the second wireless network based on the gateway identifier, wherein the second network service request includes the second network user identifier and the authorization key.

8. The method of claim 7 further comprising:
   in the gateway, transferring the second network service request to the subscriber system.

9. The method of claim 8 further comprising:
   in the subscriber system, comparing the authorization key included in the second network service request to the authorization key included in the information block, and if the authorization key included in the second network service request matches the authorization key included in the information block, then transferring an authorization approval to the gateway.

10. The method of claim 9 further comprising:
    in the gateway, assigning the packet address enabled for the second wireless network to the wireless communication device associated with the second network user identifier, and transferring the packet address enabled for the second wireless network to the router.

11. The method of claim 1 wherein the first wireless network comprises a code division multiple access (CDMA) core network and the second wireless network comprises a long term evolution (LTE) core network.

12. The method of claim 1 wherein the dual-mode functionality comprises code division multiple access (CDMA) and long term evolution (LTE) modes.

13. The method of claim 1 wherein the router comprises a home agent and the authorization system comprises an Authentication, Authorization, and Accounting (AAA) server.

14. The method of claim 1 further comprising:
    if the session for the second wireless network exists, then in the authorization system, transferring a second network user identifier to the router;
    in the router, transferring the second network user identifier to a gateway in the second wireless network; and
    in the gateway, determining the packet address enabled for the second wireless network associated with the second network user identifier, and transferring the packet address enabled for the second wireless network to the router.

15. The method of claim 1 further comprising:
    if the session for the second wireless network does not exist, then in the authorization system, translating the first network user identifier into a second network user identifier;
    in the authorization system, transferring a pre-authorization request to a subscriber system, wherein the pre-authorization request includes the second network user identifier;
    in the subscriber system, generating an information block in response to the pre-authorization request and transferring the information block to the authorization system, wherein the information block comprises the second network user identifier, a gateway identifier, and an authorization key;
in the authorization system, transferring the information block to the router;
in the router, transferring a second network service request to a gateway in the second wireless network based on the gateway identifier, wherein the second network service request includes the second network user identifier and the authorization key;
in the gateway, transferring the second network service request to the subscriber system;
in the subscriber system, comparing the authorization key included in the second network service request to the authorization key included in the information block, and if the authorization key included in the second network service request matches the authorization key included in the information block, then transferring an authorization approval to the gateway; and
in the gateway, assigning the packet address enabled for the second wireless network to the wireless communication device associated with the second network user identifier, and transferring the packet address enabled for the second wireless network to the router.

16. A method of assigning a single packet address to a wireless communication device in a communication system comprising a first wireless network and a second wireless network, the method comprising:
in the wireless communication device, transferring a first network service request to a router in the first wireless network, wherein the first network service request includes a first network user identifier;
in the router, transferring an authorization request to an authorization system, wherein the authorization request includes the first network user identifier;
in the authorization system, determining whether the wireless communication device associated with the first network user identifier comprises dual-mode functionality, and translating the first network user identifier into a second network user identifier;
in the authorization system, transferring a pre-authorization request to a subscriber system, wherein the pre-authorization request includes the second network user identifier;
in the subscriber system, generating an information block in response to the pre-authorization request and transferring the information block to the authorization system, wherein the information block comprises the second network user identifier, a gateway identifier, and an authorization key;
in the authorization system, transferring the information block and a request for a packet address enabled for the second wireless network to the router;
in the router, transferring a second network service request to a gateway in the second wireless network based on the gateway identifier, wherein the second network service request includes the second network user identifier and the authorization key;
in the gateway, transferring the second network service request to the subscriber system;
in the subscriber system, comparing the authorization key included in the second network service request to the authorization key included in the information block, and if the authorization key included in the second network service request matches the authorization key included in the information block, then transferring an authorization approval to the gateway;
in the gateway, assigning the packet address enabled for the second wireless network to the wireless communication device associated with the second network user identifier, and transferring the packet address enabled for the second wireless network to the router; and
in the router, transferring a first network service response to the wireless communication device, wherein the first network service response includes the packet address enabled for the second wireless network.

17. A method of assigning a single packet address to a wireless communication device in a communication system comprising a code division multiple access (CDMA) core network and a long term evolution (LTE) core network, the method comprising:
in the wireless communication device, transferring a CDMA service request to a home agent, wherein the CDMA service request includes a CDMA user identifier;
in the home agent, transferring an authorization request to an Authentication, Authorization, and Accounting (AAA) server, wherein the authorization request includes the CDMA user identifier;
in the AAA server, determining whether the wireless communication device associated with the CDMA user identifier comprises dual-mode functionality, and determining whether a LTE session exists based on the CDMA user identifier;
if the LTE session does not exist, then in the AAA server, translating the CDMA user identifier into an LTE user identifier, transferring a pre-authorization request that includes the LTE user identifier to a subscriber system, wherein the subscriber system generates an information block in response to the pre-authorization request, receiving the information block in response to the pre-authorization request, wherein the information block comprises the LTE user identifier and an authorization key, and transferring a request for an LTE packet address to the home agent; and
in the home agent, transferring a CDMA service response to the wireless communication device, wherein the CDMA service response includes the LTE packet address.

* * * * *